(12) United States Patent
Oh et al.

(10) Patent No.: US 7,534,279 B2
(45) Date of Patent: May 19, 2009

(54) MULTI-CYCLONE DUST COLLECTING APPARATUS

(75) Inventors: Jang-keun Oh, Gwangju (KR); Jung-gyun Han, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 575 days.

(21) Appl. No.: 11/283,385

(22) Filed: Nov. 18, 2005

(65) Prior Publication Data

US 2006/0230717 A1 Oct. 19, 2006

Related U.S. Application Data

(60) Provisional application No. 60/666,091, filed on Mar. 29, 2005.

(30) Foreign Application Priority Data

May 4, 2005 (KR) ............... 10-2005-0037703

(51) Int. Cl.
*B01D 45/12* (2006.01)
(52) U.S. Cl. .................. 55/343; 55/346; 55/429; 55/DIG. 3
(58) Field of Classification Search .......... 55/343, 55/346, 349, 429, 459.1, DIG. 3; 15/350, 15/353
See application file for complete search history.

(56) References Cited

U.S. PATENT DOCUMENTS

| | | |
|---|---|---|
| 2,372,514 A | 3/1945 | Pootjes |
| 4,222,529 A | 9/1980 | Long ................ 241/77 |
| 5,221,301 A * | 6/1993 | Giuricich ............ 55/345 |
| 6,840,972 B1 | 1/2005 | Kim ................ 55/337 |

(Continued)

FOREIGN PATENT DOCUMENTS

CN    2177531 Y    9/1994

(Continued)

OTHER PUBLICATIONS

Official Action dated Jun. 15, 2006 issued from the Korean Intellectual Property Office with respect to Korean Patent Application No. 2005-37703 filed on May 4, 2005.

(Continued)

*Primary Examiner*—Robert A Hopkins
(74) *Attorney, Agent, or Firm*—Ohlandt, Greeley, Ruggiero & Perle, L.L.P.

(57) ABSTRACT

A multi-cyclone dust collecting apparatus with improved dust collecting efficiency and suction force is provided. The multi-cyclone dust collecting apparatus includes a first and a second multi-cyclone units having a first cyclone which collects large particles of dust and a second cyclone for collecting fine particles of dust; an air inlet through which an air inlet through which dust-laden air is separated and flowed into the first and the second multi-cyclone units, respectively; and an air outlet through which air from the second cyclone of the first and the second multi-cyclone units is gathered and externally discharged. Because air is branched off once it is drawn into a single gate and dust is separated from the drawn air simultaneously in the plurality of multi-cyclone dust collecting apparatuses, reduction of flow speed in the dust-laden air from the suction brush can be prevented.

14 Claims, 3 Drawing Sheets

U.S. PATENT DOCUMENTS

2005/0229554 A1    10/2005    Oh et al. .................. 55/346

FOREIGN PATENT DOCUMENTS

| CN | 2250815 Y | 4/1997 |
|---|---|---|
| DE | 3722440 | 1/1988 |
| EP | 1488729 | 12/2004 |
| FR | 2859373 | 3/2005 |
| GB | 1055151 | 1/1967 |
| GB | 2360719 | 10/2001 |
| JP | 52-014775 | 7/1975 |
| JP | 64004271 | 1/1989 |
| JP | 2004135700 | 5/2004 |
| KR | 1020050025711 | 3/2005 |
| KR | 1020050026217 | 3/2005 |
| KR | 1020050026218 | 3/2005 |
| KR | 1020050026219 | 3/2005 |
| RU | 2019120 | 9/1994 |
| RU | 2176034 | 11/2001 |
| SE | 9601771 | 1/1997 |

OTHER PUBLICATIONS

Official Action dated Jan. 24, 2007 from Russian Patent Application No. 2005141222.

European Search Report dated Jul. 17, 2007 corresponding to European patent application No. 05292723.3-2316.

Office Action dated Sep. 21, 2007 corresponding to Chinese Patent Application No. 2005101350770.

Office Action dated Jun. 10, 2008 corresponding to Australian Patent Application No. 2005247000.

* cited by examiner

MULTI-CYCLONE DUST COLLECTING APPARATUS

CROSS-REFERENCE TO RELATED APPLICATIONS

This application claims the benefit of U.S. provisional application No. 60/666,091, filed Mar. 29, 2005, in the United States Patent & Trademark Office, and claims the benefit of Korean Patent Application No. 2005-37703, filed May 4, 2005, in the Korean Intellectual Property Office, the disclosure of both of which are incorporated herein by reference.

BACKGROUND OF THE INVENTION

1. Field of the Invention

The present invention relates to a cyclone dust collecting apparatus, and more particularly, to a multi-cyclone dust collecting apparatus having a plurality of cyclones in symmetrical arrangement, which provides improved suction speed and dust collecting efficiency.

2. Description of the Related Art

A vacuum cleaner generally draws in dust-containing air and separates dust from the drawn air. Such a conventional vacuum cleaner generally uses a dust filter as a dust collecting means, which needs replacement when ridden with dusts. Accordingly, users feel inconvenient and unhygienic as they replace the contaminant dust-laden filter with hands.

To solve the above problems, a cyclone dust collecting apparatus, which is reusable almost permanently, has been suggested. The cyclone dust collecting apparatus separates dust from the air using centrifugal force, and users can re-use the apparatus after removing the collecting dusts.

However, while the cyclone dust collecting apparatus is reusable and has removed a need for use of dust bag or dust filter, it also has a shortcoming in that it is inefficient to collect fine dusts. The same applicant has noted this problem, and thus provided a multi-cyclone dust collecting apparatus with improved fine dust collecting efficiency in Korean Patent Application Nos. 2003-62520, 2003-63211, 2003-63212 and 2003-63213. The suggested cyclone dust collecting apparatuses provide higher fine dust collecting efficiency than the prior ones, however, since it requires formation of a plurality of cyclone currents, there is a problem that flow speed at a suction brush decreases. Accordingly, an improvement is required.

SUMMARY OF THE INVENTION

The present invention has been made to overcome the problems of the prior art, and accordingly, it is an object of the present invention to provide a multi-cyclone dust collecting apparatus which is capable of collecting fine dusts from a drawn air and improving flow speed at a suction brush.

It is another object of the present invention to provide a multi-cyclone dust collecting apparatus capable of improving collecting efficiency of relatively large particles of dusts.

It is yet another object of the present invention to provide a multi-cyclone dust collecting apparatus having an improve structure to improve dust collecting efficiency.

The above aspects and/or other features of the present invention can substantially be achieved by providing a multi-cyclone dust collecting apparatus including at least two multi-cyclone units comprising a first cyclone for collecting large particles of dust, and a second cyclones for collecting fine particles of dust. The multi-cyclone units may include the second cyclones formed around an outer circumference of the first cyclone substantially in a letter 'C' formation.

According to an aspect of the present invention, a multi-cyclone dust collecting apparatus may include a first and a second cyclone units comprising a first cyclone for collecting large particles of dust, and a second cyclones for collecting fine particles of dust, an air inlet through which dust-laden air is separated and flowed into the first and the second multi-cyclone units, respectively, and an air outlet through which air from the second cyclone of the first and the second multi-cyclone units is gathered and externally discharged.

The air inlet may include a partitioning plate, and a first and a second air inlet ducts which are divided by the partitioning plate.

The first and the second multi-cyclone units may be arranged in symmetrical relation with each other. The first and the second multi-cyclone units may respectively comprise dust receptacles, which are separately formed from each other.

Because air is branched off once it is drawn into a single gate and dust is separated from the drawn air simultaneously in the plurality of multi-cyclone dust collecting apparatuses, reduction of flow speed in the dust-laden air from the suction brush can be prevented.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

Figure 1:
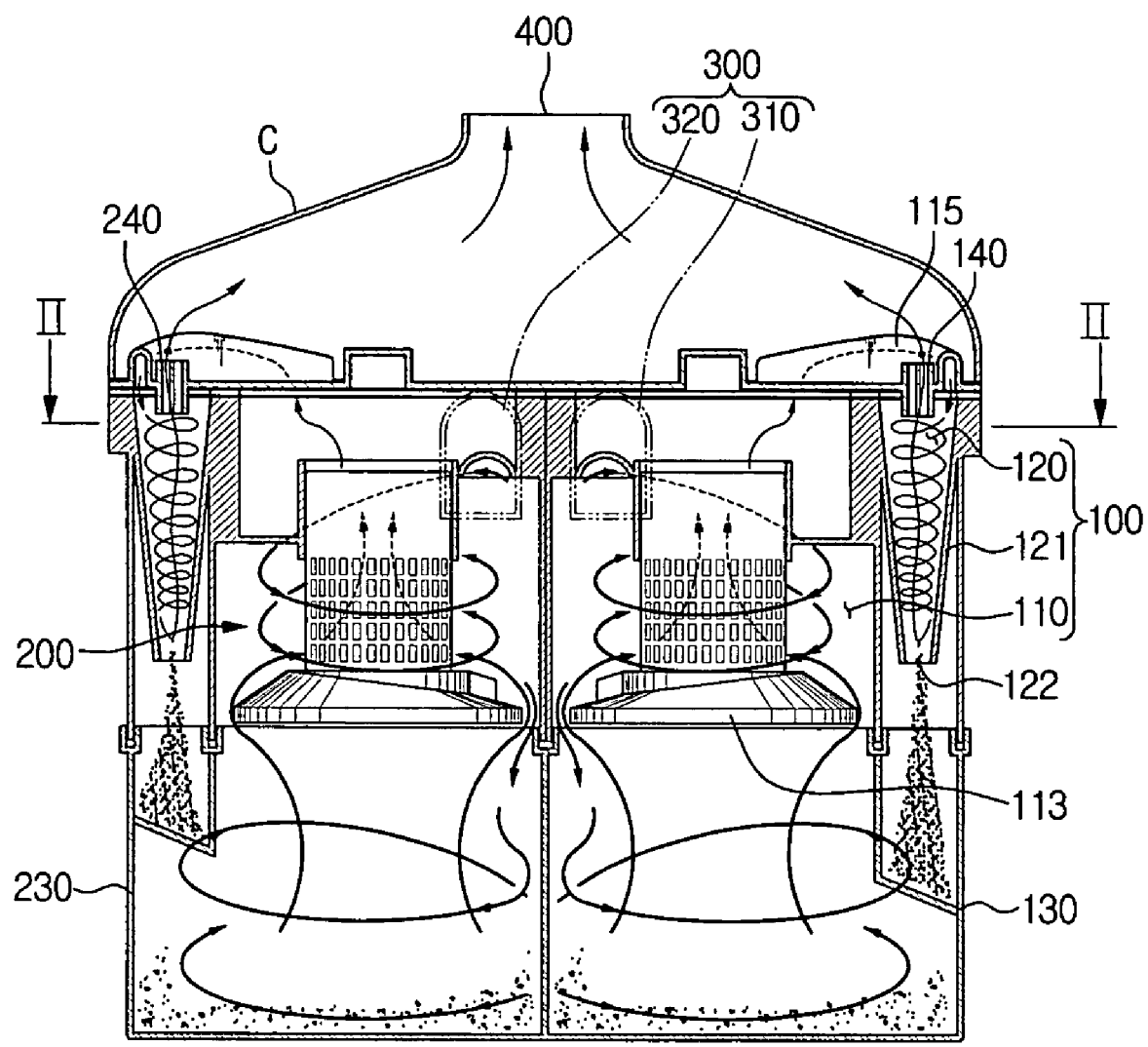
FIG. 1 is a sectional view of a multi-cyclone dust collecting apparatus according to an embodiment of the present invention.

Certain embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

A multi-cyclone dust collecting apparatus according to the present invention has a plurality of cyclone units of mirror image structure in symmetrical arrangement. With respect to FIG. 1, a multi-cyclone dust collecting apparatus according to one certain embodiment includes a first multi-cyclone unit 100, a second multi-cyclone unit 200, an air inlet 300 and an air outlet 400.

The first multi-cyclone unit 100 includes a first cyclone 110 and a second cyclone 120. The first cyclone 110 is eccentrically connected with the air inlet 300, and there are a plurality of second cyclones 120 around the first cyclone 110 in letter 'C' formation.

Accordingly, as dust-laden air flows into a spinning current while it passes through a first air inlet duct 310 branching off from the air inlet 300, dusts are separated from the air by centrifugal force. The once-filtered air is then secondly filtered through a discharge grill 113 having a backflow preventive member, flows through a spiral passage 115 connected with the discharge grill 113, and enters into the plurality of second cyclones 120 which are arranged around the first cyclone 110 in a asymmetrically-radial arrangement. As shown in FIG. 1, it is preferable to arrange six second cyclones 120 in a letter 'C' formation. Air in the second cyclones 120 is once again filtered, thus shedding off fine dusts. Dusts separated at the first and the second cyclones 110 and 120 are collected in a first dust receptacle 130. The clean air is discharged to a cleaner body through a first discharge air pipe 140.

The second multi-cyclone unit 200, as mentioned above, has a mirror image structure as that of the first multi-cyclone unit 100, and mounted in a symmetrical relation with the first multi-cyclone unit 100 with respect to the air inlet 300. The second multi-cyclone unit 200 has a second dust receptacle 230 which is separately formed from the first dust receptacle 130. Additionally, a second discharge air pipe 240 is provided.

Figure 2:
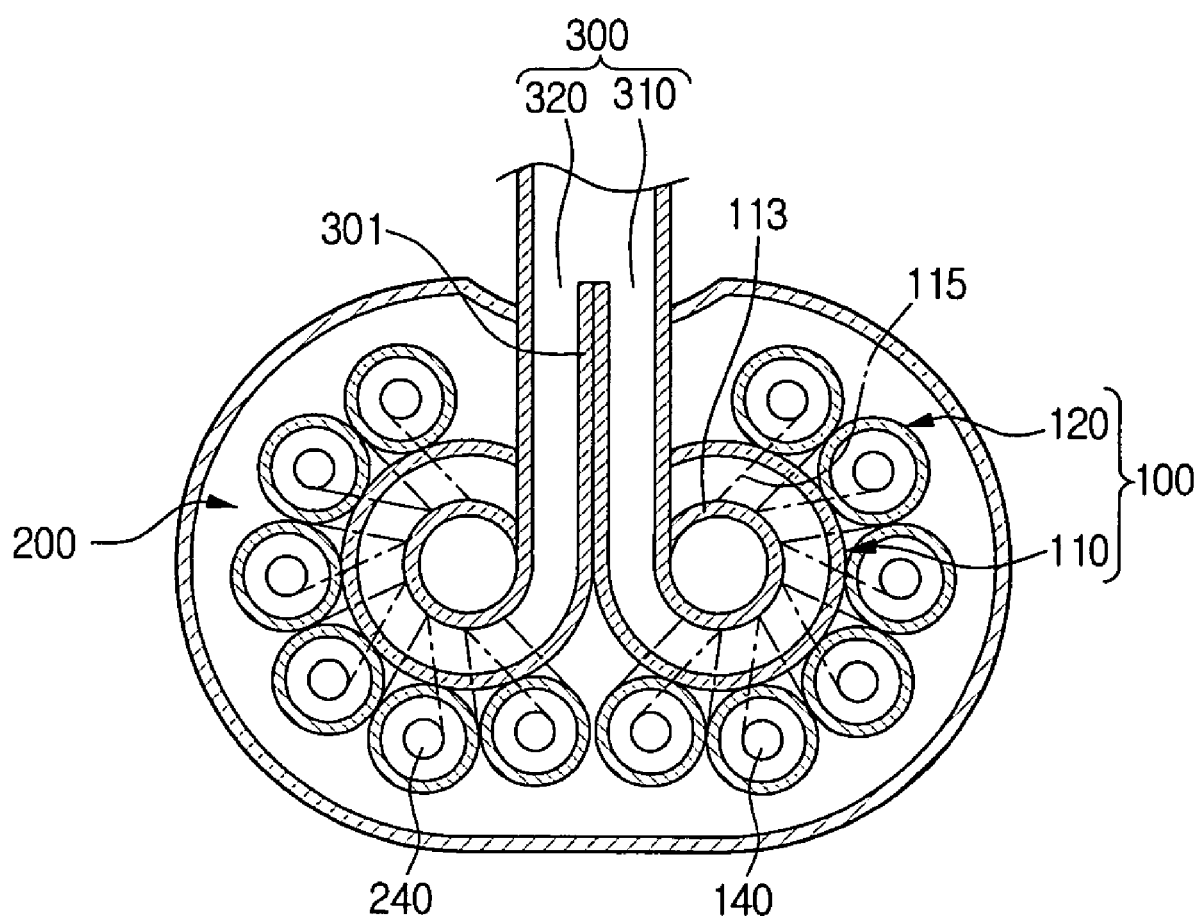
FIG. 2 is a sectional view taken on line II-II of FIG. 1.

The ambient air including dust is drawn into a cleaning unit such as a suction brush of the vacuum cleaner and supplied into both the first and the second multi-cyclone units 100 and 200 through the air inlet 300. As shown in FIG. 2, it is preferred that a partitioning plate 301 is provided in the air inlet 300 to separate interior space into a first air inlet duct 310 and a second air inlet duct 320. Accordingly, dust-laden air is supplied into the first multi-cyclone unit 100 through the first air inlet duct 310 and is supplied into the second multi-cyclone unit 200 through the second air inlet duct 320. Because the air is branched after it is drawn into a single inlet, a larger amount of air can be drawn from the suction brush (not shown) and also, a larger amount of large particles of dusts can be collected.

The air outlet 400 is formed in a cover C that is engaged to the top of the first and the second multi-cyclone units 100 and 200. Due to the presence of the air outlet 400, air from the first and the second discharge air pipes 140 and 240 of the second cyclones 120 can be gathered into one space and discharged toward a vacuum suction motor (not shown) provided at the cleaner body.

The operation of the multi-cyclone dust collecting apparatus according to an embodiment of the present invention will now be described.

Air including dust is drawn through the air inlet 300 and branched into the first and the second multi-cyclone units 100 and 200 through the first and the second air suction ducts 310 and 320, which are separated by the partitioning plate 301. Accordingly, dust is separated from the air in the first and the second multi-cyclone units 100 and 200, respectively. More specifically, large particles of dust are firstly separated in the first cyclone 110 of the first multi-cyclone unit 100, and then fine particles of dust are secondly separated by centrifugal force at the plurality of second cyclones 120. The same operation may occur in the second multi-cyclone unit 200, which is formed in symmetry with the first multi-cyclone unit 100.

After dust is removed through the first and the second multi-cyclone units 100 and 200, clean air is discharged through the first and the second discharge air pipes 140 and 240, and then gathered in one place to be discharged through the air outlet 400 toward the vacuum suction motor (not shown) provided at the cleaner body.

As described above, because dust-laden air can be filtered in parallel in the symmetrically-arranged multi-cyclone units of mirror image structures, dust collecting efficiency improves.

Figure 3:
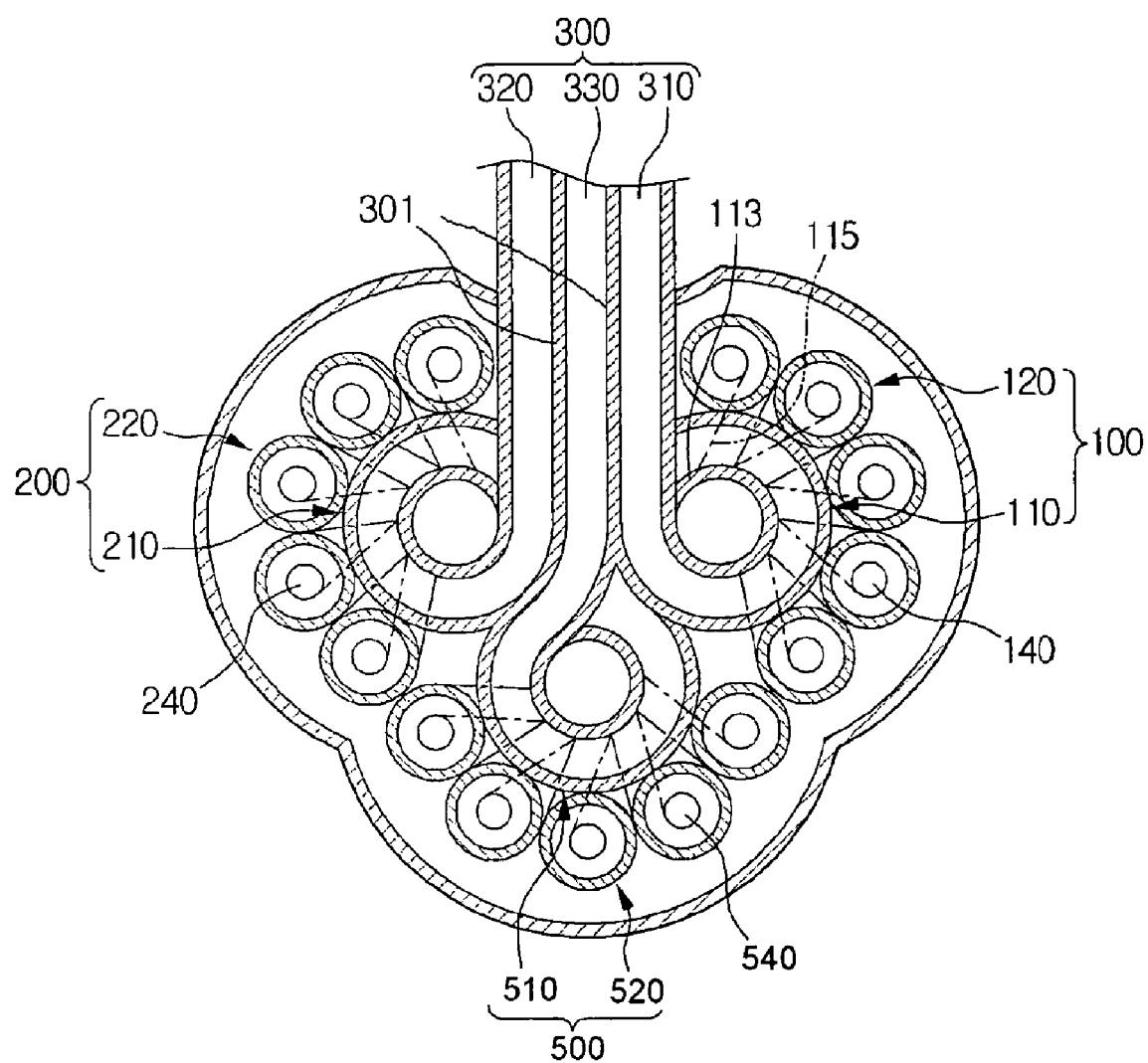
FIG. 3 is an alternate embodiment of the multi-cyclone dust collecting apparatus of FIG. 2.

Although two multi-cyclone units of high fine dust collecting efficiency in symmetrical arrangement have been exemplified in the above-described embodiment of the present invention, one will understand that this should not be construed as limiting. A variety of arrangements are possible, and for example, three or more than three multi-cyclone units sharing the same air inlet and air outlet can be arranged in parallel relation and provide the same effect as shown in FIG. 3. In this embodiment, the multi-cyclone dust collecting apparatus further includes a third multi-cyclone unit 500. The third multi-cyclone unit 500 is eccentrically connected with the air inlet 300, and includes a plurality of second cyclones 520 around a first cyclone 510 in letter 'C' formation.

As shown in FIG. 3, it is preferred that two partitioning plates 301 are provided in the air inlet 300 to separate interior space into the first air inlet duct 310, the second air inlet duct 320, and the third air inlet duct 330. Accordingly, dust-laden air is supplied into the first multi-cyclone unit 100 through the first air inlet duct 310, is supplied into the second multi-cyclone unit 200 through the second air inlet duct 320, and is supplied into the third multi-cyclone unit 500 through the third air inlet duct 330.

As dust-laden air flows into a spinning current while it passes through a third air in let duct 330 branching off from the air inlet 300, dusts are separated from the air by centrifugal force in first cycle 510. Air in the second cyclones 520 is once again filtered, thus shedding off fine dusts. Dusts separated at the first and the second cyclones 510 and 520 are collected in a third dust receptacle (not shown). The clean air is discharged to a cleaner body through a third discharge air pipe 540.

As shown in the embodiments described above, air is branched off once it is drawn into a single gate and dust is separated from the drawn air simultaneously in the plurality of multi-cyclone dust collecting apparatuses. As a result, reduction of flow speed in the dust-laden air from the suction brush (not shown) can be prevented.

Additionally, because there is provided a plurality of first cyclones to separate large particles of dust, collecting efficiency of large particles of dust can be improved.

Furthermore, because at least two first cyclones for collecting large particles of dust and at least two second cyclones for collecting fine particles of dust are arranged in symmetrical relation, fine dust collecting efficiency improve.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A multi-cyclone dust collecting apparatus, comprising:
   at least two multi-cyclone units disposed parallel and symmetrically, each comprising a first cyclone for collecting large particles of dust and a plurality of second cyclones for collecting fine particles of dust.

2. The multi-cyclone dust collecting apparatus of claim 1, wherein the plurality of second cyclones are formed around an outer circumference of the first cyclone substantially in a letter 'C' formation.

3. A multi-cyclone dust collecting apparatus, comprising:
a first cyclone unit and a second cyclone unit disposed parallel and symmetrically to each other, each comprising a first cyclone for collecting large particles of dust and a plurality of second cyclones for collecting fine particles of dust;
an air inlet through which dust-laden air is separated and flowed into the first and the second cyclone units, respectively; and
an air outlet through which air from the first and second cyclone units is gathered and externally discharged.

4. The multi-cyclone dust collecting apparatus of claim 3, wherein the air inlet comprises:
a partitioning plate; and
a first and a second air inlet ducts which are divided by the partitioning plate.

5. The multi-cyclone dust collecting apparatus of claim 3, wherein the first and second cyclone units respectively comprise dust receptacles that are separately formed from each other.

6. A multi-cyclone dust collecting apparatus, comprising:
a first cyclone unit;
a second cyclone unit arranged parallel to the first cyclone unit, said first and second cyclone units each comprising a first cyclone for collecting large particles of dust and a plurality of second cyclones for collecting fine particles of dust;
an air inlet through which dust-laden air is drawn; and
a partitioning plate in the air inlet for separating the dust-laden air into the first and the second cyclone units, respectively,
wherein the first and second cyclone units have the same structure and are disposed parallel and symmetrically.

7. The multi-cyclone dust collecting apparatus of claim 6, further comprising an air outlet through which air from the first and second cyclone units is gathered and externally discharged.

8. The multi-cyclone dust collecting apparatus of claim 6, wherein the first and the second cyclone units are mirror images of one another.

9. The multi-cyclone dust collecting apparatus of claim 6, wherein the plurality of second cyclones are formed around an outer circumference of the first cyclone.

10. The multi-cyclone dust collecting apparatus of claim 9, wherein the plurality of second cyclones are formed around the outer circumference of the first cyclone substantially in a letter 'C' formation.

11. The multi-cyclone dust collecting apparatus of claim 6, wherein the dust-laden air is branched off by the partitioning plate once it is drawn into a single gate.

12. The multi-cyclone dust collecting apparatus of claim 6, wherein dust is separated from the dust-laden air simultaneously in the first and second cyclone units.

13. A multi-cyclone dust collecting apparatus, comprising:
a first cyclone unit;
a second cyclone unit arranged parallel to the first cyclone unit, said first and second cyclone units each comprising a first cyclone for collecting large particles of dust and a plurality of second cyclones for collecting fine particles of dust;
an air inlet through which dust-laden air is drawn;
a partitioning plate in the air inlet for separating the dust-laden air into the first and the second cyclone units, respectively; and
a third cyclone unit arranged parallel to the first and second cyclone unit.

14. The multi-cyclone dust collecting apparatus of claim wherein the first and second cyclone units are mirror images of one another.

* * * * *